O. S. SCHAIRER.
STARTING MECHANISM FOR AUTOMOBILES.
APPLICATION FILED AUG. 22, 1913. RENEWED JULY 2, 1920.

1,370,051.                                        Patented Mar. 1, 1921.
                                                      2 SHEETS—SHEET 2.

WITNESSES:
Fred A. Lind
J. R. Langley

INVENTOR
Otto S. Schairer
BY
Wesley G. Carr
ATTORNEY

UNITED STATES PATENT OFFICE.

OTTO S. SCHAIRER, OF OAKMONT, PENNSYLVANIA, ASSIGNOR TO WESTINGHOUSE ELECTRIC AND MANUFACTURING COMPANY, A CORPORATION OF PENNSYLVANIA.

STARTING MECHANISM FOR AUTOMOBILES.

1,370,051.   Specification of Letters Patent.   Patented Mar. 1, 1921.

Application filed August 22, 1913, Serial No. 786,071. Renewed July 2, 1920. Serial No. 393,567.

*To all whom it may concern:*

Be it known that I, OTTO S. SCHAIRER, a citizen of the United States, and a resident of Edgewood Park, in the county of Allegheny and State of Pennsylvania, have invented a new and useful Improvement in Starting Mechanism for Automobiles, of which the following is a specification.

My invention relates to electrical starting and generating apparatus for automobiles that are driven by internal combustion engines, and it has particular reference to systems in which a dynamo-electric machine may be employed as a motor to start the engine or as a generator driven by the engine when the latter operates under its own power.

My invention has for its object to provide means for connecting a dynamo-electric machine to an engine shaft, whereby different relative speeds are obtained when operating respectively as a motor and as a generator.

In the use of dynamo-electric machines in which a starting motor and a generator are combined in a single unit, it is essential that a small machine be employed in order to avoid excessive weight. A small machine requires the employment of reduction gearing in order that a high speed may be used to develop the torque necessary to turn the engine shaft in starting. If the same speed ratio were employed after the engine starts under its own power, the machine would be operated as a generator at an excessive speed. It is necessary, therefore, to employ a lower speed ratio for operation as a generator, and it is highly desirable to effect the change from one system of gearing to the other in a single operation.

I have provided an arrangement which embodies two sets of gear mechanisms between the dynamo-electric machine and the engine shaft, one for starting and the other for generation of current for lighting, ignition and charging. A lever, which is under control of the operator, breaks the connection of the dynamo-electric machine to the engine shaft through one set of gearing and, at the same time, effects a connection through the other set of gear mechanism. Ignition mechanism, which is combined with the generator structure, is operated in synchronism with the engine shaft at all times through one set of gear connections.

Figure 1:
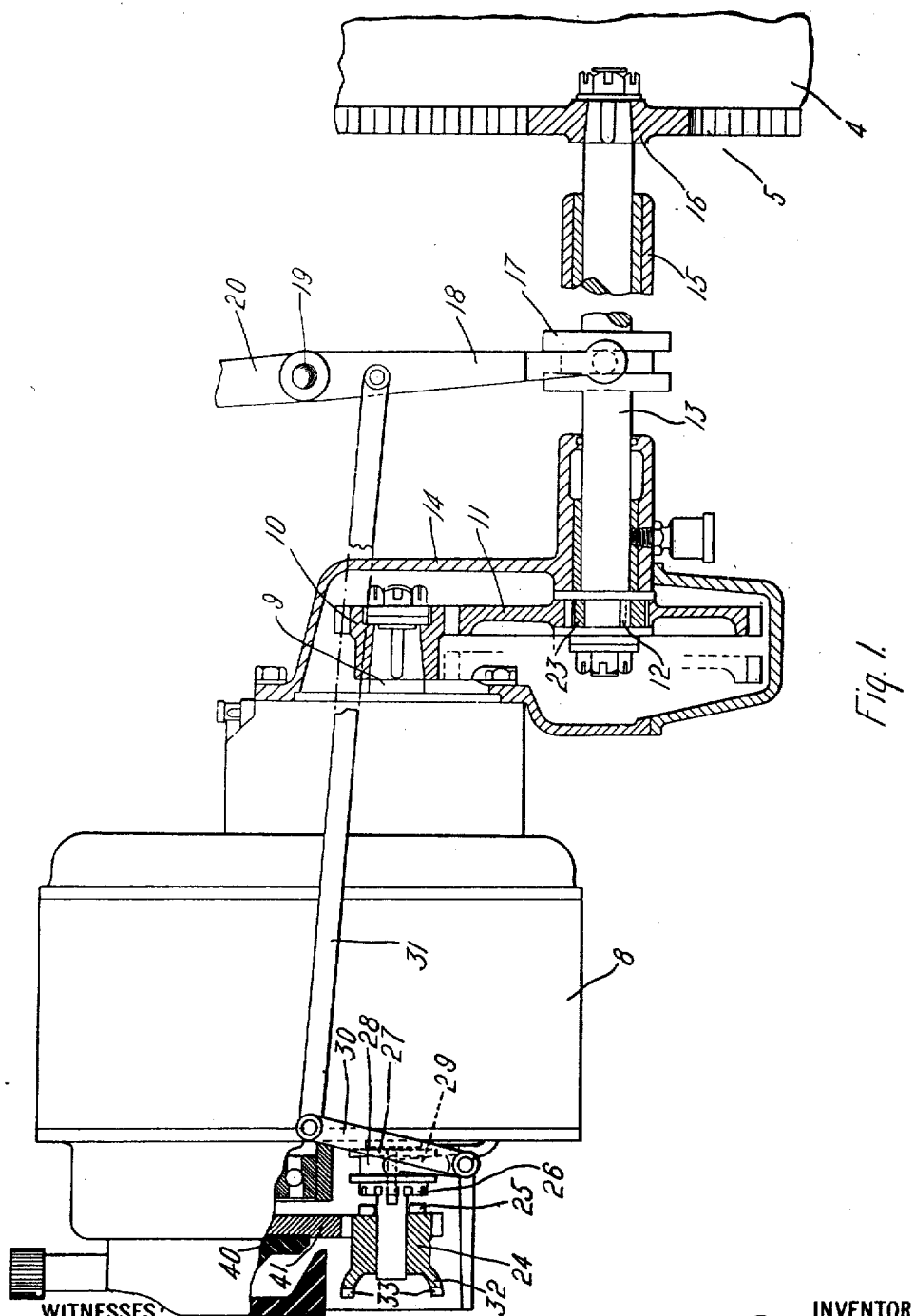
Figure 2:
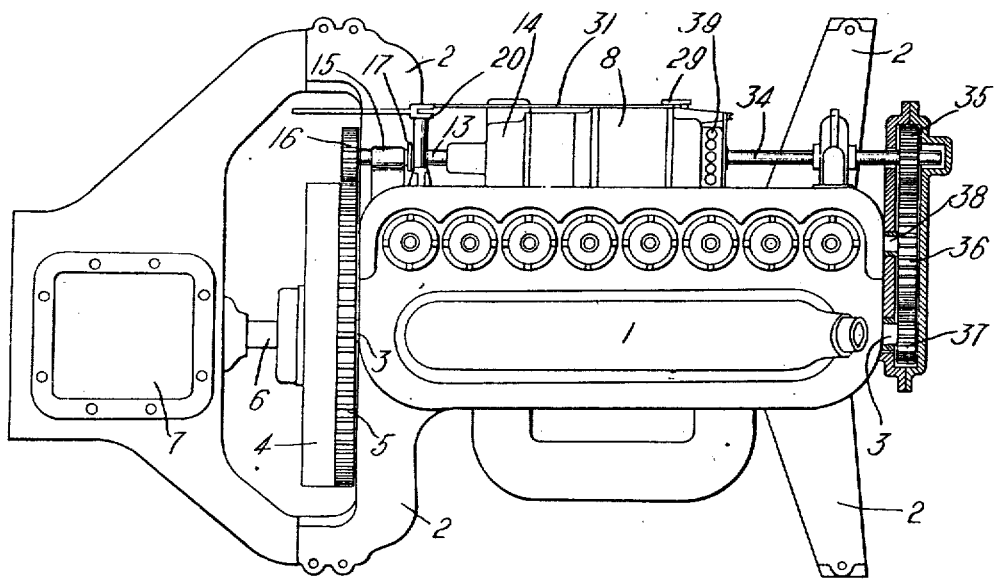
Figure 3:
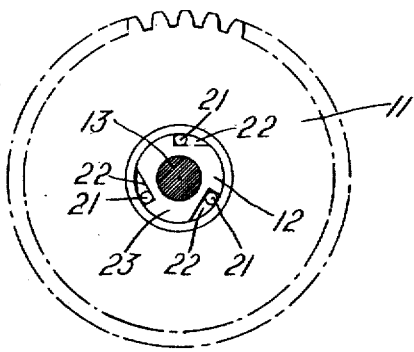

In the accompanying drawings, Figure 1 is a side view, partially in elevation and partially in section, of a dynamo-electric machine arranged in accordance with my invention. Fig. 2 is a top view, partially in plan and partially in section, of a gas engine and related mechanism with my invention applied thereto. Fig. 3 is a detail view of a clutch.

Referring particularly to Fig. 2, an internal combustion engine 1 is provided with a supporting structure comprising arms 2 that are adapted to be attached to the chassis of an automobile in any well known manner. The engine comprises a shaft 3 and a fly wheel 4 having gear teeth 5 upon its periphery. The usual transmission shaft is indicated at 6 and the gear case into which it extends is indicated at 7. A dynamo-electric machine 8, which may be operated either as a motor or as a generator, is attached to the engine structure in any suitable manner, and is operatively connected to the engine shaft by mechanisms to be described.

Referring now to Fig. 1, the generator armature shaft 9 is provided, at its front end, with a fixed pinion 10 which coacts with a gear wheel 11. The gear wheel 11 is connected, by means of a one-way clutch 12 of the roller type, to a slidable shaft 13 that has a bearing in a housing 14 and a bracket 15. A pinion 16 is mounted upon the slidable shaft 13 at its front end, and is adapted to be shifted by it into and out of mesh with the fly wheel gear teeth 5, substantially simultaneously with the corresponding movement of the gear wheel 11 into and out of mesh with the pinion 10. The shaft 13 is provided with a grooved collar member 17 to be engaged by the bifurcated end of a yoke member 18 having a pivotal support indicated at 19. The yoke member 18 is connected by means of a lever 20 to a suitable pedal or lever (not shown) located within convenient reach of the operator.

The clutch 12, which is shown in detail in Fig. 3, comprises rollers 21 that are mounted in inclined grooves 22 in a collar 23 fixed to the shaft 13. The clutch is arranged to allow the shaft 13 to overrun the gear wheel 11 when the engine starts under its own power.

A gear wheel 24, which is rotatably mounted upon the rear end of the armature shaft 9, is provided upon its inner face with a clutch member comprising teeth 25 which coact with the corresponding teeth 26 of a clutch member 27. The clutch member 27 is splined upon the armature shaft 9 and is provided with a groove 28 to be engaged by a yoke member 29. A lever 30 and a link 31 connect the yoke member 29 to the yoke member 18 so that a movement of the lever 20 produces a simultaneous movement of the clutch member 27 and the slidable shaft 13 and, with it, the gear wheel 11 and the pinion 16.

The gear wheel 24 is provided with a projecting flange 32 having notches 33 that are adapted to be engaged by corresponding projections (not shown) on a shaft 34 for endwise connection with the same. As illustrated in Fig. 2, the shaft 34 is connected to the engine shaft 3 by means of gear wheels 35, 36 and 37. The gear wheel 36 operates the cam shaft 38 of the engine at one-half the speed of the engine shaft.

The generator 8 has combined with it ignition mechanism, indicated broadly at 39, which comprises a distributer disk 40 and a gear wheel 41 which is connected to the disk for rotating the same. The gear wheel 41 meshes with the gear wheel 24 which has a fixed speed ratio with the engine shaft and thus insures that the ignition mechanism will be operated in synchronism with the engine shaft regardless of the speed of the armature 9.

Normally, the slidable shaft 13 is in its left hand position with the gear wheel 11 in its disengaged position indicated by dotted lines (Fig. 1) and with the pinion 16 out of mesh with the fly wheel gear teeth 5. When the shaft 13 occupies this position, the clutch teeth 25 and 26 are in engagement to connect the armature shaft 9 to the gear wheel 24. To start the engine, the operator actuates the lever 20 through any suitable mechanism to shift the rod 31 forwardly and thereby effect the substantially simultaneous meshing of the gear wheel 11 with the pinion 10 and the pinion 16 with the gear teeth 5, respectively, and also the disengagement of the clutch teeth 25 and 26. The generator is then operated as a motor through any suitable electrical connections (not shown) to rotate the engine shaft through the pinion 10, gear wheel 11, clutch 12, shaft 13, pinion 16, and fly wheel 4.

While the speed ratio between the generator and the engine shaft through the connecting means just described may be dapted to various sizes of generators and engines, it may be, for example approximately 18 to 1, in order to allow the generator to operate as a motor at a high speed. The gear wheel 24 is rotated through the gear wheels 37, 36 and 35 and the shaft 34 at approximately the same speed as the engine shaft but much slower than the armature shaft 9, the disengagement of the clutch teeth 25 and 26 permitting relative movement of these parts.

When the engine starts under its own power, it will drive the shaft 13 at a speed which exceeds that of the gear wheel 11, the clutch 12 allowing the shaft to overrun the gear wheel. The operator will immediately actuate the lever 20 to shift the rod 13 into its left hand position and thus shift the pinion 16 and the gear 11 out of mesh with the gear teeth 5 and the pinion 10, respectively. At the same time, the clutch member 27 is shifted into engagement with the clutch teeth 25 of the gear wheel 24 and the generator is then operated at engine speed. While it is desirable that the change of speed ratio be made as soon as possible after the starting of the engine, a slight delay will not affect the successful operation of my invention. The roller clutch 12 prevents the actuation of the generator through the reduction gear mechanism so that it cannot be actuated at an excessive speed. The normal speed of the generator, when acting as a motor, is substantially the same as that for generation, so that little or no shock would be caused by the engagement of the clutch members after some delay, because the inertia of the armature would tend to maintain its normal operating speed.

I claim as my invention:

1. The combination with an engine shaft, of a dynamo-electric machine having an armature shaft and comprising ignition mechanism, a gear wheel operatively connecting said engine shaft to said ignition mechanism always at a fixed speed ratio, a clutch member on said gear wheel, a coacting clutch member slidably mounted on said armature shaft, and manually operable means for controlling said slidable clutch member.

2. The combination with an engine shaft and a dynamo-electric machine, of means for operatively connecting said machine to said engine shaft at different speed ratios, said means comprising two trains of gear mechanism, one of which comprises a slidable shaft having gear wheels mounted at its ends, a clutch member for connection to the other train of gear mechanism, and means for simultaneously controlling said slidable shaft and said clutch member.

3. The combination with an engine shaft, of a dynamo-electric machine having an armature shaft and comprising ignition mechanism, a gear wheel operatively connected to said engine shaft and to said ignition mechanism, a clutch member on said gear wheel, a coacting clutch member slidably mounted on said armature shaft, reduction gear mechanism comprising a slidable shaft for operatively connecting said armature shaft to said engine shaft, and means for simultaneously controlling said slidable clutch member and said slidable shaft.

4. The combination with an engine shaft, of a dynamo-electric machine having an armature shaft and comprising ignition mechanism, of means for operatively connecting said armature shaft to said engine shaft at a high speed ratio, means, comprising a gear wheel having a fixed speed ratio with the engine shaft and operatively connected to said ignition mechanism, for operatively connecting said armature shaft to said engine shaft at a low speed ratio, and means for simultaneously controlling said connecting means.

In testimony whereof, I have hereunto subscribed my name this 14th day of August, 1913.

OTTO S. SCHAIRER.

Witnesses:
A. M. LUNDY,
B. B. HINES.